(12) United States Patent
Putnam et al.

(10) Patent No.: US 6,420,509 B1
(45) Date of Patent: Jul. 16, 2002

(54) MIXABLE ROOM TEMPERATURE CASTABLE POLYURETHANE SYSTEM

(75) Inventors: John W. Putnam, Glastonbury; Laurence E. Bernat, Woodstock; John P. Wesson, Vernon; John H. Vontell, Manchester, all of CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 09/668,206

(22) Filed: Sep. 22, 2000

Related U.S. Application Data

(63) Continuation-in-part of application No. 09/222,090, filed on Dec. 29, 1998, now abandoned.

(51) Int. Cl.$^7$ ................................................ C08G 18/10
(52) U.S. Cl. .............................. 528/61; 528/63; 528/64; 528/67
(58) Field of Search ............................ 528/61, 63, 64, 528/67

(56) References Cited

U.S. PATENT DOCUMENTS

| | | |
|---|---|---|
| 3,725,354 A | 4/1973 | Sundholm |
| 4,689,356 A | 8/1987 | Peffley et al. |
| 5,198,522 A | 3/1993 | Steppan et al. |
| 6,114,488 A * | 9/2000 | Kulp et al. |

FOREIGN PATENT DOCUMENTS

| | | |
|---|---|---|
| EP | 0 283 216 | 9/1988 |
| EP | 0 459 692 | 12/1991 |

* cited by examiner

*Primary Examiner*—Rachel Gorr
(74) *Attorney, Agent, or Firm*—Bachman & LaPointe, P.C.

(57) ABSTRACT

The present invention relates to a polyurethane compound which has particular utility as a potting compound for fan exit guide vane assemblies of commercial gas turbine engines. The polyurethane compound comprises a formulation of polyurethane prepolymers mixed with an aromatic amine curing agent (hardener) in a volumetric mix ratio in the range of from about 0.9:1 to about 1:1. The polyurethane prepolymer consists of a blend of different polyethers based on diphenylmethane diisocyanate (MDI). The amine curing agent is a blend of oligomeric diamines with an aromatic diamine with a catalytic component. Both of the blends, in an uncured state, are liquid at room temperature.

24 Claims, No Drawings

MIXABLE ROOM TEMPERATURE CASTABLE POLYURETHANE SYSTEM

CROSS-REFERENCE TO RELATED APPLICATIONS

This is a continuation-in-part application of U.S. patent application Ser. No. 09/222,090, now abandoned, entitled A MIXABLE ROOM TEMPERATURE CASTABLE POLYURETHANE SYSTEM, filed Dec. 29, 1998.

BACKGROUND OF THE INVENTION

The present invention relates to an improved polyurethane compound which has utility as a potting compound in fan exit guide vane assemblies of commercial gas turbine engines.

Polyurethane compounds have been used as potting compounds in fan exit guide vane assemblies of commercial gas turbine engines. Currently available polyurethane potting materials suffer from a number of deficiencies. For example, some are difficult to process, resulting in high rework and/or poor yield. Others contain hazardous materials which require special handling procedures and which can not be used at all at many Manufacturing facilities.

One polyurethane compound which has been used is one from a company named Jonal. The compound is difficult to work with, as i t requires heating of the resin above 180 degrees Fahrenheit and melting of the hardener above 300 degrees Fahrenheit, before mixing. The combining of the two heated components is done by weight and a hand measured mark on the delivery system cartridge, which introduces mix variations. Once combined, the system has a working life of eight minutes. The hand mixing introduces another variable into the system along with entrapped air that cannot be removed in the short work-life time. The entrapped air bubbles are cause for vane assembly rejection/rework.

Thus, there remains a need for a polyurethane compound which has improved quality, manufacturing properties and adhesive strength.

It is the aim of the present invention to provide a polyurethane compound which fulfills this need.

SUMMARY OF THE INVENTION

Accordingly, it is an object of the present invention to provide a polyurethane compound which has improved quality, manufacturing properties and adhesive strength.

It is a further object of the present invention to provide a polyurethane compound as above which has utility as a potting compound in fan exit guide vane assemblies of commercial gas turbine engines.

It is a further object of the present invention to provide a polyurethane compound as above which can be mixed in manufacturing friendly automated equipment.

It is yet a further object of the present invention to provide a polyurethane compound as above which can be packaged without the introduction of air.

The polyurethane compound of the present invention meets the foregoing objects.

In accordance with the present invention, a polyurethane compound or system is provided which contains a formulation of polyurethane prepolymers mixed with an aromatic amine curing agent in a volumetric mix ratio of from about 0.9:1 to about 1:1. The formulation of polyurethane prepolymers consists of a blend of different polyethers based on diphenylmethane diisocyanate or, in other words, a blend of prepolymers made from polyethers and diphenylmethane diisocyanate. The aromatic amine curing agent preferably comprises a blend of oligomeric diamines and an aromatic diamine with a catalytic component. Both of the blends, when in an uncured state, are liquid at room temperature. Polyether type prepolymers are important for moisture and solvent resistance. Polyurethane based MDI prepolymers or MDI polyurethane prepolymers are important for health and safety reasons, for being liquid at room temperature, and for offering better adhesion properties. Aromatic amine curing is important for best thermal stability and moisture resistance.

Other details of the polyurethane compound of the present invention, as well as other objects and advantages attendant thereto, are set forth in the following detailed description.

DETAILED DESCRIPTION OF THE PREFERRED EMBODIMENT(S)

In accordance with the present invention, a preferred polyurethane compound is formed by mixing a formulation of polyurethane prepolymers with an aromatic amine curing agent in a volumetric mix ratio of about 0.9:1 to an about 1:1, preferably from about 0.95:1 to about 1:1.

The polyurethane prepolymer formulation in accordance with the present invention consists of a blend of different polyethers based on diphenylmethane diisocyanate (MDI), which blend has an NCO content in the range of about 11.5% to about 14.5%, preferably from about 12% to 14%, and most preferably about 13%. As used herein, the term NCO content means the grams of NCO per gram of prepolymer.

A polyether based MDI prepolymer to be used in the present invention should have a structure as follows:

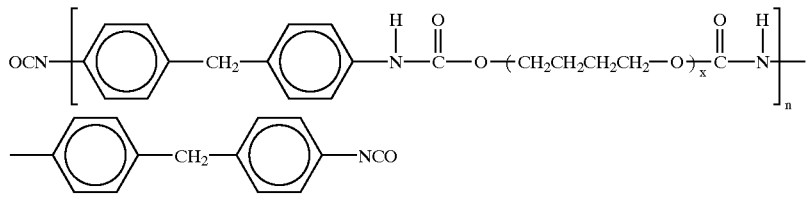

where $x \geq 1$ and n has a repeat value of 0 to 4, preferably 1 to 2.

There are any number of commercially available materials that meet the foregoing structure. Suitable polyether based MDI prepolymers include Versathane SME-75A, Versathane SME-80A, Versathane SME-90A, Versathane SME-95A, and QG 162 (all manufactured by Air Products Corporation), Rubinate 9009 and Rubinate 1027 (both produced by ICI), Vibrathane B-625, Vibrathane B-635, Vibrathane B-670 and Vibrathane B-836 (all produced by Uniroyal), and Andur M-10.

The different polyethers which are used to form the blend preferably comprise two types of diphenylmethane diisocyanates. The first type of polyether has a NCO content in the range of from about 13.5% to about 16.5%, preferably in the range of from about 14% to about 16%, and most preferably about 15%, a density of about 1.2 g/cm$^3$, and an equivalent weight of about 286 g/mol. Equivalent weight is the molecular weight divided by the number of reactive sites or equivalents on the prepolymer. One such material which may be used for the first type of polyether is Andur M-10. The second type of polyether has a NCO content in the range of from about 9.7% to about 12.7%, preferably from about 10.2% to about 12.2%, and most preferably about 11.2%, a density of about 1.06 g/cm$^3$, and an equivalent weight of about 375 g/mol. One such suitable material which may be used for the second type of polyether is Vibrathane B-670.

The polyurethane prepolymer formulation is prepared by combining the two polyether types at room temperature, stirring them to obtain a homogeneous solution, de-aerating at room temperature, and handling using standard dry conditions for moisture sensitive urethanes. The two polyethers are mixed in volumetric amounts sufficient to provide the resulting blend with a NCO content in the range of about 11.5% to about 14.5%, preferably about 12% to 14% and most preferably about 13%. When using the aforementioned representative materials, 61.6 g of Andur M-10 may be mixed with 68.4 g of Vibrathane B-670 to form a useful polyether blend.

The aromatic amine curing agent (hardener) is formed from two oligomeric aromatic diamines (that is, polyether polymers terminated with aromatic amines) and a third aromatic diamine. The oligomeric aromatic diamines used in the present invention have a structure such as:

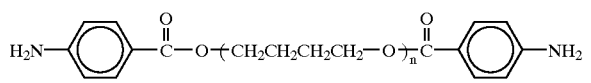

Suitable aromatic amines which may be used in the present invention include Versalink P-250, Versalink P-650, Versalink P-1000, Polacure 740M and Lonzacure MCDEA (all manufactured by Air Products) and Unilink 4100 and Unilink 4200 (both manufactured by UOP). The desired amine to NCO Stiochiometric ratio is between about 0.85:1 and about 1.05:1, preferably from about 0.9:1 to about 1:1, and ideally about 0.95:1.

The first of the oligomeric diamines to be used to form the curing agent preferably has a density of about 1.04 g/cm$^3$ and an equivalent weight of about 235 g/mol. A suitable oligomeric diamine which can be used for the first oligomeric diamine is Versalink P250. The second of the oligomeric diamines to be used to form the curing agent preferably has a density of about 1.04 g/cm$^3$ and an equivalent weight of about 415 g/mol. Versalink P250 has an average repeat value of n=3.5. A suitable oligomeric diamine which can be used for the second oligomeric diamine is Versalink P650. Versalink P650 has an average repeat value of n =9.5. The third aromatic diamine to be used to form the curing agent is preferably characterized by chlorine groups attached to it and has a density of about 0.95 g/cm$^3$ and an equivalent weight of about 190 g/mol. The chemical structure for this aromatic diamine is:

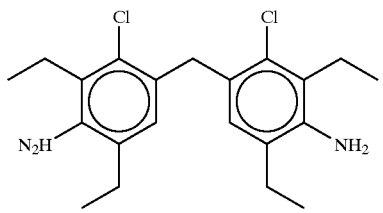

A suitable material for use as the third amine is Lonzacure MCDEA. When the aforesaid materials are used to form the curing agent blend, they may be present in the ratio of 75.2 g of Versalink P650 to 31.0 g of Versalink P250 to 13.1 g of Lonzacure MCDEA.

The aromatic amine curing agent preferably is formed by heating the second oligomeric diamine (Versalink P250) to a temperature of 180° F. to melt the semisolid. This temperature may be lowered to accommodate different types of ovens; however, lower temperatures require longer times. The third amine (Lonzacure) is added and the mixture is heated at 180° F. until the third amine is completely dissolved. This temperature may be lowered to accommodate certain ovens if needed. The first oligomeric diamine material is then added and heated at 180° F. until completely dissolved. This temperature may be lowered to accommodate drum heater limitations. The mixture is then cooled to room temperature and used for packaging. At room temperature, the mixture is a flowing liquid. As previously mentioned, the polyurethane prepolymer blend and the aromatic amine curing agent, when in an uncured state, are both liquid at room temperature. This allows them to be packaged in cartridges without the introduction of air into the cartridges. This greatly reduces the number of voids in the final part and leads to the production of higher quality parts. The fact that both components are liquid also allows them to be mixed in a manufacturing friendly automated equipment. To form the final polyurethane compound, the blended polyurethane prepolymer and the blended amine curing agent can be passed through a mixing nozzle, such as a motionless mixing nozzle, in a volumetric mix ratio of blended polyurethane prepolymer to amine curing agent in the range of from about 0.9:1 to about 1:1, preferably from about 0.95:1 to about 1:1.

It has been found that the polyurethane compound formed by the blended components possess many admirable qualities. For example, the polyurethane compound of the present invention has extremely high adhesive strength to aluminum, titanium, polyetherimide, epoxy/graphite composites and other aerospace materials. The polyurethane compound also has good damping characteristics for gas turbine engine applications such as vane potting. Still further, the polyurethane compound of the present invention has good heat resistance up to 250° F. and is resistant to most gas turbine engine fluids. The polyurethane compound of the present invention is also castable into any desired shape.

To pot a vane assembly, such as a fan exit guide vane assembly, the vane assembly is placed in a trench in a support structure. The polyurethane compound is then introduced into the trench at room temperature by causing the two blended components of the compound in liquid form to pass through a mixing nozzle and exit the nozzle into the trench. Heat is then applied to cure the polyurethane compound. As can be seen from the foregoing description, a potting process using the polyurethane compound of the present invention is relatively simple to carry out.

EXAMPLE I

To illustrate the improvements created by the polyurethane compound of the present invention, the following example was performed. A formulation of polyurethane prepolymers and a formulation of aromatic amine curing agent in accordance with the present invention were prepared. The polyurethane prepolymer formulation and the aromatic amine curing agent formulation were mixed in a 1:1 ratio and injected through a mixing nozzle at room temperature into a trench in a support structure holding a trial vane. Eleven trial vanes were potted with this polyurethane compound system. Examination of these vanes showed that there was a very low level to no indication of entrapped air. Further, these parts successfully met dimensional and pull test requirements and the polyurethane compounds met or exceeded all requirements as shown in Table 1.

TABLE 1

PWA 597 Specification Test

| PWA 597 Requirement | | P & W Formulation |
|---|---|---|
| As received material | | |
| Tensile Strength (psi) | 4000 Min. | 4230 |
| Elongation (%) | 400 Min. | 440 |
| Ten. Strength @ 100% El. | 700 | 1760 |
| Hardness shore A | 85–95 | 92–93 |
| Tear Resistance Lb./In. | 200 | 629 |
| Dry heat resistance 257° F./70 hours | | |
| Tensile Strength reduction | 25% Max. | 2% |
| Elongation reduction | 10% Max. | 19% increase |
| Hardness increase | 0–10 | 1 |
| Bend Flat | no cracks | pass |
| Fuel resistance ASTM ref. Fuel B (77° F./22 hours) | | |
| Hardness reduction | −10 | −4 |
| Volume change % | 0–35 | 16.6 |
| Bend Flat | no cracks | pass |
| Oil Resistance SAE Ester test fluid #2 (257° F./22 hours) | | |
| Hardness reduction | −10 | −4 |
| Volume change % | 0–30 | 22.7 |
| Bend Flat | no cracks | pass |
| Hot Water (212° F./5 hours) | | |
| Hardness increase | 5 Max. | −10 |
| Volume change % | 0–15 | 4.2 |
| Bend Flat | no cracks | pass |
| Low Temperature (−60° F./5 hours) | | |
| Bend Flat | no cracks | pass |
| Compression Set (25% compression 203° F./22 hours) | | |
| <75% of compression | | 36 |

In addition, thermal and humidity durability exposure tests of the thus formed polyurethane compound as compared to the prior Jonal potting compound were carried out. The 250° F./500 hour exposure indicated the polyurethane compound in accordance with the present invention had superior tensile properties at both the room and 250° F. test temperatures. The 140° F./95% RH/15 & 21 day exposure indicated that the polyurethane compound of the present invention had a debit in tensile strength compared to the Jonal material at both room and 250° F. test temperatures. With both exposures and test temperatures, the polyurethane compound of the present invention maintained good elongation properties. The Jonal material from both exposures at the 250° F. test temperature showed a significant drop in elongation.

Durability average test results of tensile strength (psi) and elongation (%) respectively are shown below in Table 2.

TABLE 2

Durability Comparison

| Material | Test Temp | RH Exposed 15 days | 250F/500 Exposed |
|---|---|---|---|
| Baseline tensile: P & W Formulation = 4230 psi | | | |
| P & W Formulation | RT | 1733 | 4700 |
| Jonal | RT | 2192 | 2100 |
| | | RH Exposed 21 days | |
| P & W Formulation | 250° F. | 443 | 992 |
| Jonal | 250° F. | 796 | 599 |
| Baseline elongation: P & W Formulation = 440% | | | |
| P & W Formulation | RT | 445 | 534 |
| Jonal | RT | 444 | 573 |
| | | RH Exposed 21 days | |
| P & W Formulation | 250° F. | 500 | 531 |
| Jonal | 250° F. | 196 | 159 |

The fan exit guide vane part prints require that vane assembly meet a minimum 1500 pound force pull on the end caps. Six vane assemblies were tested with the polyurethane compound in accordance with the present invention with the results ranging from 2550 to 3200 pounds force and averaging 2800 pounds force. The monthly vane pull test with the Jonal supplied polyurethane potting material had a range of 1500 to 2400 pounds.

EXAMPLE 2

In addition to the above example, a test was conducted using a polyurethane compound prepared in accordance with the present invention. The formulation was tested on 4 vane assemblies with 1 vane humidity exposed and 1 vane thermally exposed at 140° F./95% RH/14.5 days and 250° F./14.5 days respectively. These vanes tested at 1900 pounds and 3500 pounds. The 2 baseline vanes tested at 2600 and 2700 pounds.

The FEGVs (Fan Exit Guide Vanes) used for the above tests all passed visual and dimensional requirements of the potting operation.

It is apparent that there has been provided in accordance with the present invention a mixable room temperature castable polyurethane system which fully satisfies the means, objects, and advantages set forth hereinbefore. While the present invention has been described in combination with specific embodiments thereof, it is evident that many alternatives, modifications and variations will be apparent to those skilled in the art in light of the foregoing description. Accordingly, it is intended to embrace all such alternatives, modifications, and variations as fall within the spirit and broad scope of the appended claims.

What is claimed is:

1. A polyurethane compound comprising a first component and a second component, said first component consisting of a blend of different polyether based MDI prepolymers, each of said polyether prepolymers having a different diphenylmethane diisocyanate component, said second component comprising an amine curing agent consisting of a blend of diamines, and said first and second components being present in a volumetric mix ratio of the first component to the second component in the range of from 0.9:1 to 1:1.

2. A polyurethane compound comprising a first component and a second component, said first component consisting of a blend of different polyether based MDI prepolymers, each of said polyether prepolymers having a different diphenylmethane diisiocyanate content, said second component comprising an amine curing agent consisting of a blend of diamines, and said first and second components being present in a volumetric mix ratio of the first component to the second component in the range of from about 0.95:1 to 1:1.

3. The polyurethane compound according to claim 1, wherein each of said first and second components when in an uncured state is liquid at room temperature.

4. The polyurethane compound according to claim 1, wherein said first component has a NCO content in the range of from 11.5% to 14.5%.

5. The polyurethane compound according to claim 4, wherein said NCO content is in the range of from about 12% to about 14%.

6. The polyurethane compound according to claim 4, wherein said NCO content is about 13%.

7. The polyurethane compound according to claim 1, wherein said first component comprises a blend of a first diphenylmethane diisocyanate component having a density of about 1.2 g/cm$^3$, an equivalent weight of about 286 g/mol and a NCO content in the range of from about 13.5% to about 16.5% and a second diphenylmethane diisocyanate component having a density of about 1.06 g/cm$^3$, an equivalent weight of about 375 g/mol, and a NCO content in the range of from about 9.7% to about 12.7%.

8. The polyurethane compound according to claim 1, wherein said first component has a first diphenylmethane diisocyanate component with a NCO content, in the range of from 14% to 16% and a second diphenylmethane diisocyanate component with a NCO content in the range of from 10.2% to 12.2%.

9. The polyurethane compound according to claim 1, wherein said first component has a first diphenylmethane diisocyanate component with a NCO content of about 15% and a second diphenylmethane diisocyanate component with a NCO content of about 11.2%.

10. The polyurethane compound according to claim 1, wherein said second component comprises a blend of two oligomer diamines having different equivalent weights and an amine having chlorine groups attached thereto.

11. The polyurethane compound according to claim 10, wherein said second component has an amine to NCO stiochiometric ratio between about 0.85:1 and about 1.05:1.

12. The polyurethane compound according to claim 11, wherein said amine to NCO stiochiometric ratio is between about 0.9:1 and about 1:1.

13. The polyurethane compound according to claim 11, wherein said amine to NCO stiochiometric ratio is about 0.95:1.

14. The polyurethane compound according to claim 10, wherein said second component comprises a blend of a first oligomeric diamine having an equivalent weight of about 235 g/mol and a density of about 1.04 g/cm$^3$, a second oligomeric diamine having an equivalent weight of about 415 g/mol and a density of about 1.04 g/cm$^3$, and a diamine having an equivalent weight of about 190 g/mol and a density of 0.95 g/cm$^3$.

15. A polyurethane compound for potting vanes for use in a turbine engine, said polyurethane compound comprising:

a first component comprising a blend of different prepolymers made from polyethers and diphenylmethane diisocyanate; and a second component comprising a blend of oligomeric aromatic diamines and an aromatic diamine with a catalytic component.

16. The polyurethane compound according to claim 15, further comprising each of said first and second components being liquid at room temperature when in an uncured state.

17. The polyurethane compound according to claim 15, further comprising a volumetric mix ratio of the first component to said second component in the range of from about 0.9:1 to about 1:1.

18. The polyurethane compound according to claim 15, wherein said first component comprises a blend of a first polyether based diphenylmethane diisocyanate prepolymer having a first NCO content and a second polyether based diphenylmethane diisocyanate prepolymer having a second NCO content, which second NCO content is different from said first NCO content.

19. The polyurethane compound according to claim 18, wherein said blend has a NCO content of about 13%.

20. The polyurethane compound according to claim 15, wherein said second component comprises a blend of two oligomer diamines having different equivalent weights and a diamine having chlorine groups attached to it.

21. A method for making a polyurethane compound comprising:

providing a formulation of polyurethane prepolymers in liquid form at room temperature;

said step of providing a formulation of polyurethane prepolymers comprises providing a blend of different polyether based MDI prepolymers;

providing an aromatic amine curing agent in liquid form at room temperature; and mixing said blend of different polyether based MDI prepolymers with said amine curing agent in a volumetric ratio of 0.9:1 to about 1:1.

22. The method according to claim 21, wherein said step of providing a blend of different polyether based MDI prepolymers comprises blending a first polyether based MDI prepolymer having a NCO content in the range of from about 13.5% to about 16.5% with a second polyether based MDI prepolymer having a NCO content in the range of from about 9.7% to about 12.7%.

23. The method according to claim 21, wherein said step of providing an aromatic amine curing agent comprises providing a blend of oligomeric diamines and an aromatic diamine with a catalytic component.

24. The method according to claim 23, wherein said blend providing step comprises blending two oligomeric diamines having different equivalent weights with said aromatic diamine.

* * * * *